though they contribute to spoilage by souring the product or by imparting undesirable flavors or odors thereto. The second type of spoilage is the most serious one since it is caused by the action of pathogenic forms including enterotoxigenic bacteria which do not normally impart any detectable odor or flavor to the food but which do produce poisoning when the food is eaten. Although the present invention is of value in retarding both types of spoilage, it is particularly directed to the protection of cream-custard type food compositions from the action of enterotoxigenic bacteria such as *Micrococcus pyogenes*.

United States Patent Office
Patented June 28, 1955

2,711,976

METHOD OF PRESERVING CREAM-CUSTARD TYPE FOOD PRODUCTS AND THE RESULTING COMPOSITION

Anthony G. Castellani, Chicago, Ill., assignor to American Institute of Baking, Chicago, Ill., a corporation of Illinois No Drawing. Application March 27, 1953,
Serial No. 345,225

13 Claims. (Cl. 99—150)

This invention relates to improved food compositions of the cream-custard type and more particularly to a novel means for protecting such food compositions against spoilage.

It is well known that food poisoning outbreaks have sometimes been attributed to food products of the cream-custard type such as cream pies, custard pies, other cream or custard filled pastries, puddings, and the like. As prepared for consumption, a cream-custard type product has the consistency of a moist soft gel and comprises a highly complex and nutritious medium for the rapid growth of microorganisms. In fact, it would be difficult to find a more suitable medium for microbial growth, especially if the composition is kept at favorable temperatures. Although in the production process these cream-custard type foods are usually subjected to a certain amount of heat treatment or cooking in order to congeal the same, the heat treatment is never sufficient to destroy all forms of microbial life. Consequently, it is important to observe all precautions necessary to prevent rapid microbial growth and to prevent microbial contamination at all stages of the production process.

Although the importance of adequate sanitary procedures cannot be minimized, the provision of a simple and effective bacteriostatic technique which is readily adaptable to cream-custard type foods would obviously constitute a highly advantageous adjunct in the prevention of food poisoning outbreaks. Moreover, such a technique would be highly attractive both to the baking industry and to public health authorities since it would contribute to increased public confidence in the safety and reliability of cream-custard type foods and would also be of material assistance in helping the baker comply with local health regulations.

Accordingly, a primary object of my invention is to provide a novel bacteriostatic agent for cream-custard type foods which is edible and readily available and is, therefore, useful in the prevention of food poisoning outbreaks.

A further object of my invention is to provide novel and improved food compositions of the cream-custard type, such as pastry fillings, puddings, and the like, said compositions being characterized by a relatively high resistance to attack by microorganisms.

A still further object of the invention is to provide novel liquid and dry mixes useful in the preparation of cream-custard type food compositions having a high degree of resistance to attack by microorganisms.

Another object of the invention is to provide a novel means for protecting food compositions of the foregoing character against spoilage due to the presence of enterotoxigenic bacteria such as *Micrococcus pyogenes*.

Still another object of the invention is to provide a novel method for inhibiting microbial growth in food compositions of the cream-custard type and imparting to said food compositions an increased resistance to attack by microorganisms.

Other objects and advantages of my invention will become apparent from the subsequent detailed description.

Briefly, the present invention is based on the discovery that certain monocarboxylic compounds, particularly certain amino acids of the monoamino monocarboxylic class, posses marked bacteriostatic properties for enterotoxigenic microorganisms when added to cream-custard type food compositions. Consequently, these compounds can be incorporated in relatively small amounts in cream-custard type foods to inhibit microbial growth and thereby increase the resistance of the foods to attack by microorganisms. More specifically, I have discovered that serine, glycine, cysteine and thioglycollic acid are highly effective for the foregoing purpose when used in minor amounts usually less than 1% by weight of the food composition and preferably not over 0.5% by weight.

The food products with which the present invention is concerned are highly familiar to the public generally as well as to those versed in the art, and for purposes of the present application these food compositions will be referred to as being of the "cream-custard type." By this terminology it will be understood that I intend to embrace cream fillings, custard fillings, chiffon fillings, puddings, and various liquid and dry mixes which are capable of being converted to fillings and puddings of this same character. Generally speaking, the consistency of a cream-custard type food as prepared for consumption is a moist soft gel, and is most often used as a filling for pies and other pastries. The most significant ingredients of cream-custard type foods are milk and eggs, either or both of which are invariably present in this type of food composition. In adidtion, the composition may also contain sugar, starch, flour and water or any combination of the same. Usually, the congealing of the mixture to its final consistency is accomplished by a heat treatment which, in the case of filled pastry, may result from precooking or from a baking operation after the pastry shell is filled. In the case of the so-called chiffon pies or pastries, the cream or custard filling may contain an added amount of gelatin or whipped egg white in order to impart to the filling the characteristic chiffon consistency.

As will hereinafter appear, the presence of milk and/or eggs in the cream-custard food composition is known to provide a highly favorable medium responsible for rapid microbial growth in this type of food composition. The medium is always relatively complex and provides an excellent nutritional environment for bacterial growth with consequent low resistance to attack by microorganisms, especially when the temperatures are favorable for microbial growth.

From a commercial or practical viewpoint the application of the principles of the invention to preformed mixtures of liquids or dry ingredients is particularly important. Thus, the invention contemplates liquid cream mixes of the type which are congealed by a cooking or heat treating operation and are prone to undergo spoilage both before and after congealing. In addition, the invention is also applicable to prepared dry mixes in powdered form, such as the familiar commercial pudding mixes, which are adapted to be constituted by the addition of a liquid such as milk or water. A heating or cooking operation may or may not be necessary to effect congealing of the constituted mixture depending upon the composition of the mix.

As hereinbefore pointed out, the complex and highly nutritious nature of cream-custard type food compositions renders them extremely vulnerable to attack and spoilage by microorganisms. For present purposes, this spoilage may be considered to be of two types. In one type, the spoilage is a result of the action of certain natural flora which are generally considered non-pathogenic but which upon excessive growth have a highly unfavorable effect on the consistency and palatability of the food as judged by conventional standards. In other words, the growth of these natural flora results in an unfavorable odor, flavor, or taste but does not cause food poisoning in the usual sense. An important point in this connection is that these natural or indigenous flora are often heat resistant and, therefore, survive the cooking or heat treating operation usually carried out in the preparation of these food compositions for consumption.

The other type of spoilage involves the production of one or more enterotoxins responsible for the symptoms of food poisoning or gastro-enteritis. Often the existence of this type of spoilage in the cream-custard food is not detectable at the time the product is consumed and there is usually a delay of several hours or more in the development of the symptoms of food poisoning. Although there are several types of bacteria which are known to be responsible for so-called "food poisoning," the most frequent offenders in the case of cream-custard bakery or pastry products are certain strains of *Micrococcus pyogenes*, the disturbances due to these bacteria being more commonly referred to as staphylococcus food poisoning.

As will hereinafter appear, the bacteriostatic agents or microbial growth inhibitors of the present invention are effective not only against the enterotoxigenic microorganisms such as *Micrococcus pyogenes* but are also effective against the heat resistant indigenous or natural flora which survive the usual cooking or heat treating operation and are responsible for the first type of food spoilage referred to above. Consequently, by means of the present invention it is possible to realize a marked reduction in the total bacteria count of the food composition so that local sanitary regulations may be more readily complied with.

I have discovered that by incorporating in a cream-custard type food composition a minor amount of serine, glycine, cysteine, or thioglycollic acid, the resultant composition has a greatly increased resistance to attack by microorganisms as determined by conventional bacteriological methods. The bacteriostatic agent or inhibitor being readily soluble may be added to the cream-custard food at any desired point during the preparation of the food composition but it will generally be found most convenient to add the inhibitor to the liquid mix prior to thickening or congealing of the same by heating. In the case of dry powdered mixes, the inhibitor may be composited with the dry ingredients and is, therefore, available when the dry mix is constituted and ultimately congealed. Only a minor amount of the inhibitor is required, this amount usually being less than about 1% by weight of the food composition and preferably not over about 0.5% by weight.

Both cysteine and thioglycollic acid tend to impart somewhat unfavorable organoleptic properties to the cream-custard foods and consequently are less desirable than the other named inhibitors. However, when used in the minimum amounts especially in a highly flavored cream-custard filling or the like the undesirable organoleptic qualities of cysteine and thioglycollic acid may be masked or diminished to an appreciable degree. As between serine and glycine, the inhibitory effectiveness of glycine is not as great as that of serine so that the preferred bacteriostatic agent in the present invention is serine. It has also been found that the various optical isomers of serine including DL-serine, D-serine, and the naturally occurring L-serine are all effective inhibitors for the purpose herein described. Moreover, the amino acids being generally considered at nutrilites or natural metabolites are edible materials which can be included in food compositions for human consumption without objection.

The following specific examples are presented for purposes of illustrating the invention in greater detail.

EXAMPLE I

In this example the invention was tested in connection with a cream filling formula containing both milk and eggs and having the following composition:

*Table A*

| Ingredient | | Quantity |
|---|---|---|
| Water | ml | 600 |
| Starch | g | 30 |
| Non-fat milk solids | g | 50 |
| Salt | g | 2.3 |
| Shortening | g | 34 |
| Sucrose | g | 136 |
| Whole Eggs | | 2 |
| Vanilla | ml | 5 |

The dry constituents were mixed together and the water, beaten eggs, and vanilla added thereafter. The constituted liquid mix was then dispensed in individual beakers in predetermined aliquots and shortening added to each individual aliquot. The test substance was added to the liquid mix aliquots in an amount of about 0.1% by weight and the samples were then thickened by heating in a boiling water bath. Certain of the thickened aliquots were inoculated with *Micrococcus pyogenes* 210 while other samples were maintained in their original condition as controls. Thereafter, both the inoculated and uninoculated samples were incubated at 30° C. for about 24 hours after which the samples were subjected to bacteriological analysis by conventional techniques.

The bacteria counts of the indigenous flora were made employing a plating medium comprising 1% tryptone, 1% yeast extract, 1% glucose, 0.5% dipotassium phosphate, and 1.5% agar with a pH 7.0 before sterilization. One per cent sterile milk was used as the plating diluent. The micrococci were counted by employing a plating medium of the same previous composition to which 10% sodium chloride was added to obtain a selective medium for the micrococci. In this case distilled water was used as the diluent. The results were as follows in the case of the uninoculated samples:

*Table B*

| Inhibitor | Bacteria Count per g. (indigenous flora) |
|---|---|
| None | 87,000,000 |
| DL-serine | 2,490,000 |
| L (+) cysteine | 17,700,000 |
| glycine | 200,000,000 |
| thioglycollic acid | less than 10,000 |

In the case of the other samples inoculated with 600 *Micrococcus pyogenes* 210 organisms per ml., the results were as follows:

*Table C*

| Inhibitor | Bacteria Count per g. (inoculated micrococci) |
|---|---|
| None | 1,360,000,000 |
| DL-serine | 500,000 |
| L (+) cysteine | 10,000,000 |
| glycine | 36,000,000 |
| thioglycollic acid | 150,000 |

From the foregoing data it will be quite evident that all of the test substances were effective against *Micrococcus pyogenes* var. *aureus* 210. Furthermore, DL-serine, L(+) cysteine, and thioglycollic acid definitely impart an increased resistance to attack by either the micrococci or by the normal indigenous flora present in the uninoculated samples.

Generally similar results have also been observed with respect to the inhibition of attack by the indigenous flora when the liquid cream mixes are tested without thickening or congealing. Moreover, certain of the above compounds have been found to be highly effective in inhibiting other strains of *Micrococcus pyogenes*. For example, L(+) cysteine in a concentration of 0.1% by weight was effective with strains 161 and 196 of *Micrococcus pyogenes*. In a concentration of 0.2% by weight, cysteine was also observed to be toxic to the C2 strain of *Micrococcus pyogenes*.

EXAMPLE II

In order to establish that the increased protection imparted to cream-custard type foods by the inhibitors of the present invention was not peculiar to one strain of *Micrococcus pyogenes*, DL-serine was tested against other strains known to be food poisoning types as a result of monkey or human feeding experiments. In each case the cream filling formula of Example I was employed with 0.1% by weight of DL-serine, the inocula in each case ranging from 300 to 800 organisms per ml. of filling. Using the same bacteriological technique described in Example I, the results of these tests are presented in Table D below:

*Table D*

| Strain No. | Bacteria count per g. | |
|---|---|---|
| | Without serine | With serine |
| 210 | 1,110,000,000 | 510,000 |
| 1 | 360,000,000 | 240,000 |
| 196 | 750,000,000 | 1,310,000 |
| 93 | | 3,600,000 |
| S6 | | 6,000,000 |
| S12 | 950,000,000 | 4,900,000 |
| 161 | 640,000,000 | 8,900,000 |
| F2B | 900,000,000 | 27,800,000 |
| C2 | 940,000,000 | 70,000,000 |

It will be seen that all strains tested were definitely inhibited although, as would be expected, the magnitude of the inhibition was not the same in each case.

EXAMPLE III

In order to investigate the possibility that only certain optical isomers of serine might be effective as inhibitors, a series of experiments was carried out using the cream filling formula and bacteria count methods of Example I in which the test samples were inoculated with the C2 strain of *Micrococcus pyogenes* at a level of about 900 organisms per ml. of filling. The results of these tests are presented in Table E below:

*Table E*

| Wt. Percent Serine | Bacteria count per g. |
|---|---|
| 0 | 594,000,000 |
| .1 DL | 8,000,000 |
| .1 L | 2,300,000 |
| .1 D | 1,400,000 |
| .1 L+.1 D | 40,000 |

It will be evident that all of the isomeric forms of serine have effective inhibitory properties so that the mechanism of the inhibition apparently does not depend on the isomeric configuration of the compound.

EXAMPLE IV

As has been previously indicated, the composition of the cream-custard food is a factor which affects the degree of inhibition. It is well known that milk and eggs are among the most nutritious ingredients for microbial growth. Accordingly, comparative experiments were made to observe the effect of eliminating either of these important nutrients from the pastry filling. The complete filling of Example I was used for comparison and modified fillings omitting the milk ingredient in one case and the egg ingredient in the other case were also tested using 0.1% by weight of DL-serine and an inoculum of about 1300 organisms per ml. of the C2 strain of *Micrococcus pyogenes*. The data from these tests were as follows (same plate count method as in Example I):

*Table F*

| Composition of sample filling | Bacteria count per g. | |
|---|---|---|
| | Without serine | With serine |
| 1. Water, starch, sucrose, non fat milk powder, shortening, salt, whole egg | 690,000,000 | 52,200,000 |
| 2. Minus milk only | 220,000,000 | 1,300,000 |
| 3. Minus egg only | 10,600,000 | 30,000 |

It will be observed from the foregoing data that the protection imparted by DL-serine is least in the case of the most nutritious product containing both milk and eggs. When milk is omitted from the formula, the inhibitory effectiveness is greater, and the greatest inhibition is noted in connection with the formula lacking whole egg. Obviously, the effectiveness of the inhibitor depends on the composition of the food product being protected.

Similar results were noted when the modified fillings were tested with the 210 strain of *Micrococcus pyogenes*.

EXAMPLE V

Using the same cream filling formula and bacteriological technique of Example I, a further set of data were obtained to demonstrate the effectiveness of different amounts of DL-serine. In each case the test sample contained an inoculum of about 20,200 organisms per ml. of the C2 strain of *Micrococcus pyogenes*. The results were as follows:

*Table G*

| Wt. Percent DL-serine | Bacteria count per g. |
|---|---|
| 0 | 930,000,000 |
| .2 | 15,600,000 |
| .3 | 4,400,000 |
| .4 | 1,300,000 |

It can be concluded from the foregoing data that the degree of protection imparted to the product depends on the amount of DL-serine incorporated therein. Consequently, it will be understood that in practicing the invention the amount of inhibitor employed may vary in different cases dependent upon the other factors hereinbefore discussed.

EXAMPLE VI

Experiments have also demonstrated that DL-serine is highly effective in connection with puddings prepared from dry mixes of the familiar commercial type. In this instance, a vanilla pudding was constituted from a commercial brand of vanilla pudding mix containing sugar, corn starch, dextrose, arrowroot starch, salt, vegetable stabilizer, vanilla, artificial flavoring, and certified color. Although milk was added in constituting the product, it will be noted that the product was devoid of egg. Test samples of the constituted and congealed pudding were inoculated with several different test strains of *Micrococcus pyogenes* and the effectiveness of 0.1% of DL-serine was investigated by the methods heretofore described with the following results:

*Table H*

| Strain No. | Inoculum per ml. of pudding | Bacteria count per g. | |
|---|---|---|---|
| | | Without serine | With serine |
| C2 | 11,000 | 79,000,000 | 200,000 |
| F2B | 31,000 | 103,000,000 | 154,000 |

It will be evident that the presence of DL-serine imparts a high degree of protection against the growth of the inoculated bacteria. Consequently, the invention lends itself readily to the commercial dry mix field since the various inhibitors may be conveniently included as an integral component of the dry mix and are, therefore, available during the constituting and congealing of the mix.

From the foregoing it will be quite evident that the addition of serine, glycine, cysteine or thioglycollic acid to cream-custard type food compositions will result in a significant degree of protection against spoilage due to microbial growth. The degree of protection will, of course, vary somewhat depending upon the inhibitor employed, the composition of the food product, and the conditions and particular microorganisms to which the food product is exposed. Although the foregoing discussion has been confined to the particular named compounds as inhibitors, it is also within the scope of my invention to employ certain obvious equivalents, for example, certain derivatives such as the sodium or other simple salts and the simple esters such as methyl and ethyl esters of these monocarboxylic compounds.

I claim:

1. A food composition of the cream-custard type containing a bacteriostatic amount of a microorganism growth inhibitor selected from the group consisting of serine, glycine, cysteine, and thioglycollic acid.

2. An improved food composition of the cream-custard type characterized by high resistance to attack by microorganisms, said composition containing at least one food ingredient selected from the group consisting of milk and eggs thereby providing a normally nutritious medium for microbial growth, and said composition also containing a bacteriostatic amount of a microbial growth inhibitor selected from the group consisting of serine, glycine, cysteine, and thioglycollic acid.

3. A food composition comprising a powdered dry mix of food ingredients adapted to be constituted to provide a food composition of the cream-custard type, and a bacteriostatic amount of a microorganism growth inhibitor selected from the group consisting of serine, glycine, cysteine, and thioglycollic acid.

4. A food composition comprising a liquid mix of food ingredients adapted to be congealed to provide a food composition of the cream-custard type, and a bacteriostatic amount of a microorganism growth inhibitor selected from the group consisting of serine, glycine, cysteine, and thioglycollic acid.

5. A food composition of the cream-custard type containing a bacteriostatic amount not more than about 1% by weight of a microorganism growth inhibitor selected from the group consisting of serine, glycine, cysteine and thioglycollic acid.

6. A food composition of the cream-custard type containing a bacteriostatic amount not more than about 0.5% by weight of a microorganism growth inhibitor selected from the group consisting of serine, glycine, cysteine, and thioglycollic acid.

7. A food composition of the cream-custard type containing as a microorganism growth inhibitor a bacteriostatic amount of serine.

8. A food composition of the cream-custard type containing as a microorganism growth inhibitor a bacteriostatic amount of D-serine.

9. A food composition of the cream-custard type containing as a microorganism growth inhibitor a bacteriostatic amount of L-serine.

10. A food composition of the cream-custard type containing as a microorganism growth inhibitor a bacteriostatic amount of DL-serine.

11. A food composition of the cream-custard type containing as a microorganism growth inhibitor a bacteriostatic amount of glycine.

12. The method of imparting to food compositions of the cream-custard type an increased resistance to attack by microorganisms which comprises incorporating in the food composition a bacteriostatic amount of a microorganism growth inhibitor selected from the group consisting of serine, glycine, cysteine and thioglycollic acid.

13. The method of imparting to food compositions of the cream-custard type an increased resistance to attack by microorganisms, particularly *Micrococcus pyogenes*, which comprises incorporating in the food composition a bacteriostatic amount not more than about 1% by weight of serine.

References Cited in the file of this patent

UNITED STATES PATENTS

| | | |
|---|---|---|
| 2,456,937 | Gyorgy et al. | Dec. 21, 1948 |
| 2,518,233 | Hall | Aug. 8, 1950 |

OTHER REFERENCES

"Retardation of Rancidity by Sulfhydryl Compounds," Science, December 1943, vol. 98, No. 2554, pages 518–520.